United States Patent [19]

Zawacki

[11] 4,069,974
[45] Jan. 24, 1978

[54] ELECTROSTATIC POWDER COATING APPARATUS

[75] Inventor: Chester W. Zawacki, Birmingham, Mich.

[73] Assignee: Ford Motor Company, Dearborn, Mich.

[21] Appl. No.: 755,301

[22] Filed: Dec. 29, 1976

[51] Int. Cl.² ............................................. B05B 5/02
[52] U.S. Cl. ...................................... 239/15; 239/120; 118/326
[58] Field of Search ........................... 239/3, 15, 120; 118/629, 312, 326

[56] References Cited

U.S. PATENT DOCUMENTS

| | | | |
|---|---|---|---|
| 2,242,182 | 5/1941 | McCann | 118/312 X |
| 3,077,859 | 2/1963 | Cook | 118/326 |
| 3,147,146 | 9/1964 | Sedlacsik, Jr. | 239/15 X |
| 3,357,640 | 12/1967 | Grossteinbeck et al. | 239/15 |

Primary Examiner—John J. Love
Attorney, Agent, or Firm—Roger L. May; Keith L. Zerschling

[57] ABSTRACT

An apparatus for applying powder coating material to a substrate is disclosed. The apparatus comprises: (A) an electrostatic spray gun for dispensing a mixture of electrostatically charged powder coating particles and a gas (e.g., air) inert to said particles; (B) a shroud which is attached to said gun; (C) a mixing chamber disposed in the rearward section of said shroud and into which said gun dispenses said mixture; (D) a forward section of said shroud having an opening adapted to be disposed in a position relative to the substrate such that powder coating particles issuing from the opening are attracted to said substrate; (E) at least two slotted openings formed by pairs of baffle plates connecting the mixing chamber with the forward section such that the pressurized mixture from said mixing chamber may pass through said slotted openings, into said forward section and through the opening therein toward the substrate to be coated; (F) field electrodes in electrical connection with said gun and being disposed in the vicinity of said slotted openings so as to create an electrostatic field in the vicinity of the opening of said forward section; and (G) a vacuum intake port disposed in the vicinity of the opening of said forward section between the slotted openings and being adapted such that eddies of said pressurized mixture flowing from the slotted openings in the direction of said port are created and such that said powder not attracted to said substrate is collected at said port.

14 Claims, 3 Drawing Figures

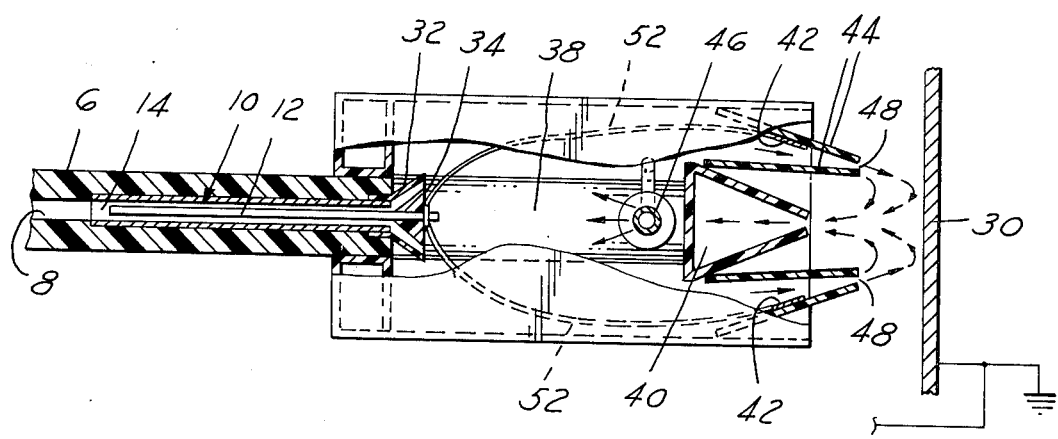
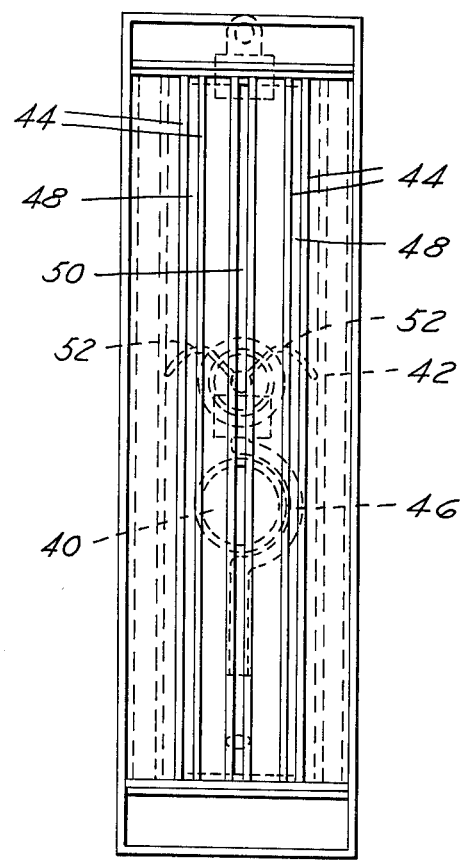

ELECTROSTATIC POWDER COATING APPARATUS

BACKGROUND OF THE INVENTION

Powder coating compositions for use in the coating or painting of the surfaces of objects are extremely desirable. In typical use, the powder coating compositions are electrostatically applied to the object to be coated. The coated object is then heated, which results in the cure of the powder coating material and in its being bonded to the object. The primary advantage of powder coating compositions over liquid coating systems is that, in the case of the former, no volatile solvent or other liquid vehicle is given off during the curing or drying of the coating. This is particularly significant in large scale commercial coating operations in which it is desirable and necessary to minimize.

Various powder coating compositions are known in the art. Typically, these materials are comprised of minute particles of resinous compounds. These resinous materials are finely pulverized to produce powder particle sizes ranging, for example, from a few microns to perhaps 50 microns.

It has been prior art practice to apply these finely pulverized powder coating materials to an object to be coated by use of electrostatic spray techniques. In a common electrostatic spray installation, the object to be coated is suspended within and moving through a spray booth where it is electrically grounded. An operator standing outside the spray booth holds an electrostatic spray gun to which a high voltage of appropriate polarity is applied. This voltage may be on the order of tens of kilovolts. A mixture of compressed air and the powder coating material is guided through the electrostatic spray gun and is discharged into the booth through an opening provided therefor. A cloud of air-suspended powder is produced within the booth and a small portion of this powder is electrostatically attracted to the surface of the object to be coated. A vacuum source draws the remainder of the air and powder coating mixture from the booth through hoppers in the floor of the booth. This booth exhaust mixture is conveyed to a dust collector where the unused powder coating material is removed from the air. The collected powder coating material may be recycled if desired when a single color is being applied in the booth. However, when powders of different colors are applied within a short time span without completely cleaning the booth and hoppers, the collected powder is a mixture of the colors and must be discarded.

In the case of large objects to be coated, it is possible to construct a large booth wherein the operator actually stands within the booth during the application of the powder coating material. However, it may be appreciated that the operator must be protected from the danger of powder inhalation, and the subatmospheric or vacuum pressure source for removing the air-suspended powder coating material from the booth must be of very large capacity.

The prior art systems described above have a number of disadvantages, several of which are:

1. They do not allow precise, definite control of the spray pattern and, thus, are not ideally suited to form a controlled design or pattern on the object being coated.

2. Where a small booth is used and the operator stands outside, only small objects may be coated.

3. Frequent changes of color are difficult because the booth and any vacuum exhaust from the booth must be thoroughly cleaned with each change of color if the unused powder is to be recycled. Failure to do this could result in a mixture of the various colors used. This problem is particularly acute in the case of a large booth where frequent color changes are even more difficult because of the booth size, a thorough cleaning of the booth being both time consuming and difficult. In those installations where it is necessary to frequently change colors, e.g., painting of automobile bodies with top coat materials, it is not practical to clean the system between colors and, therefore, it is impossible to recycle excess powder. As mentioned above, the excess powder is generally collected in hoppers in the floor of the booth and drawn by vacuum to bag houses. Obviously, when frequent changes of color are affected, the powder being drawn to the bag house contains a mixture of pigments. Thus, in such an operation, the excess powder must be discarded. This is not only wasteful, but also creates a disposal problem.

4. Because of the size of most spray booths relative to the size of the article to be coated and the open nature of the booth, any return system, to be effective, must be inordinately large. This, of course, is inefficient and raises the expense of the installation.

5. Because of the nature of most prior art spray booth installations, i.e., the object to be coated moving in an unconfined manner through the center of the booth on a conveyer, there are serious overspray problems resulting in contamination of the booth and a concomitant wast of powder.

6. Because of the somewhat open nature of the interior of most booths, stray drafts tend to affect the dust clouds causing possible variations in application density and a waste of coating material.

Ser. No. 443,555 filed Feb. 19, 1974 and now abandoned as a continuation-in-part of Ser. No. 212,294, and now abandoned, both filed by the present applicant discloses an apparatus and method which overcomes many of the deficiencies discussed above. The apparatus disclosed in that application permits frequent color changes allows more complete recovery and recycling of each color of powder employed, is adaptable for coating large as well as small objects, maximizes use of a vacuum return system, substantially reduces overspray and draft problems, and allows precise, definite control of a spray pattern. The process which achieves those results and which was claimed in that application comprises passing a powder mixture into a shroud having an opening of determined configuration positioned adjacent the grounded object to be coated so that the mixture is confined to a volume bounded in part by the object to be coated. This permits the pressurized mixture dispensed by the electrostatic spray gun to expand within the shroud, filling it with the mixture. A portion of the charged particles are electrostatically attracted to the object to form a coating on it in the configuration of the shroud opening. By employing a shroud with a configured opening it is possible using that method to apply a sharply defined pattern of paint, an accomplishment which theretofore had not been possible in the application of powders and possible in the application of liquid paints only with the use of masking. After application of the coating to the article, the remainder of the expanded mixture in accordance with that process is drawn with a subatmospheric pressure source into a chamber positioned around or surrounding the shroud.

This chamber is wholly external of the interior of the shroud and after the powder enters the chamber, the mixture flows toward the subatmospheric pressure source.

While the above discussed method and the apparatus for carrying it out overcomes many of the deficiencies of the prior art powder coating techniques and apparatus, it is still not ideally suited for application of powder coatings to substrates, particularly those of a curved contour. In fact, a serious disadvantage of the method is its marginal performance in coating sharply curved surfaces due to its dependence on a flat surface for forming a sufficient draught of air capable of causing atmospheric air to move unadhered powder to the powder collector. Also, that process, although a great improvement over prior art techniques, still demonstrates some deficiencies with respect to powder return for recycling. For maximum results with that method, it is necessary to space the shroud of the apparatus a maximum of ¼ inch from the surface to be coated in order to effect efficient return of the powder. Also, without a flat surface in place, the device used in that process is not capable of recovering powder completely. Still further, the method and device of the former application does not demonstrate optimal efficiency insofar as application of the powder to the substrate is concerned. In fact, adhesion of desposited powder with that technique is weaker than desirable. Finally, the device and method of the prior application, although an improvement over the prior art, still requires more care in cleaning than is desirable to change colors rapidly.

It is the object of this invention to overcome each of the above deficiencies by providing an apparatus in which: (1) powder over-spray is eliminated nearly completely due to a unique method of vacuuming electrostatically unadhered powder; (2) controllable auxiliary air, fed from a manifold to a mixing chamber, maybe used to assist in purging for color change; (3) application efficiency of virtually 100% is achieved due to recycling of unadhered powder; (4) precise spray patterns are achieved, controlled by the configuration of the applicator opening; (5) the device is adaptable for automation; and (6) the device demonstrates an outstanding ability to coat curved surfaces.

SUMMARY OF THE INVENTION

The above object is achieved by the apparatus of the subject invention which generally comprises:

A. means for dispensing from an orifice a pressurized mixture of powder coating particles bearing an electrostatic charge and a gas which is inert to said particles;

B. a shroud having (i) a rearward boundary which is attached to and surrounds the orifice such that said mixture may be dispensed into said shroud, and (ii) a forward section having an opening adapted to be disposed in a position relative to said substrate such that powder particles issuing from said opening are attracted to said substrate;

C. a mixing chamber disposed within said shroud between said forward section and said rearward boundary and being adapted to receive said pressurized mixture from said orifice;

D. at least two slotted openings connecting said mixing chamber with said forward section such that said pressurized mixture may pass from said chamber through said slotted opening into said forward section and through said opening in said forward section toward the substrate;

E. field electrode means in electrical connection with said means for dispensing said pressurized mixture and disposed in the vicinity of said slotted openings, said field electrode means being adapted to create an electrostatic field such that said charged particles are repelled therefrom in the direction of said substrate; and F. an intake port which is disposed in the vicinity of said opening in said forward section between said slotted openings and which is connected to a source of subatmospheric pressure such that eddies of said pressurized mixture flowing from said slotted opening in the direction of said port are created and said powder not attracted to said substrate is collected at said port.

Means for dispensing a pressurized mixture of powder coating materials and a gas, such as air, which is inert to said particles from an orifice are well known. For example, it is well known that electrostatic deposition of powder paint particles can take place by (1) fixed, applied electrostatic field lines of force; or (2) applied voltage between the charged powder and the object to be painted. For example, an electrical potential difference may be applied between the object to be coated and the electrode of a powder coating spray gun. The mixture is then guided past the spray gun electrode to thereby electrostatically charge particles of the powder coating material in the mixture.

As mentioned above, the mixing chamber of the device is disposed within the shroud between the rearward boundary and the forward section thereof. The pressurized mixture issuing from the orifice of the spray gun is directed into this mixing chamber. If desired, the device may be provided with a means for supplying additional pressurized gas to said mixing chamber to thereby control the pressure under which the mixture passes from the mixing chamber through said slotted openings to said forward section. Desirably this means for applying additional pressurized gas comprises a manifold which is adapted to supply the pressurized gas to the mixing chamber in two or more places. The positioning of these orifices of the manifold can be optimized such that the manifold not only supplies additional pressurized gas so as to control the pressure of the mixture issuing from the mixing chamber, but also serves to aid in cleaning the mixing chamber and the slotted openings of the device when it is desired to change colors. This feature of the invention makes the device of this application very efficient for use in operations where frequent color changes are required.

The slotted openings through which the pressurized mixture passes from the mixing chamber into the forward section of the shroud interior may be formed by pairs of baffle plates which converge toward each other and create a passageway of decreasing cross section in the direction of the flow of the mixture from the mixing chamber to the forward section. Generally, the slotted openings formed by the converging baffle plates will be directed slightly inward toward the intake port which is disposed centrally of the slotted openings. Preferably, the device comprises two of said slotted openings formed by pairs of baffle plates and the slotted openings extend from the top to the bottom of the shroud and are substantially parallel to each other. Also, it is preferred that the slotted openings formed by the baffle plates and the intake port be moveable relative to each other so as to adapt the device for easy control when applying powder material to various shaped surfaces and to maximize the collection of excess powder by the vacuum system. Also, in the preferred embodiment of the invention the slotted openings formed by the pairs of baffle plates extend beyond the leading edge of the forward section of the shroud. This aspect of the invention also affords greater control of the application of the powder to the substrate.

The field electrode means may comprise conductive strips which are electrically connected to the electrode of the spray gun and which are disposed in the vicinity of the slotted openings, preferably being located on the interior surface of exterior baffle plate of each of said pairs. As mentioned previously the electrode strips are employed to create an electrostatic field in the vicinity of said forward section of said shroud near said substrate to be coated. The result is that charged particles (which bear the same charge as said field) are repelled from the electrostatic field in the direction of the substrate. This gives a much greater efficiency of application than was possible with the device of Ser. No. 443,555.

In the preferred embodiment of the apparatus, the source of the subatmospheric pressure is connected to said intake port by a conduit which passes from said port through the interior of said shroud. This allows the apparatus to be rather compact, making it adaptable if desired to be used as a single hand held unit.

By employing a shroud having a configured opening in the forward section thereof it is possible to apply a sharply defined pattern of powder paint, much as was the case with the apparatus disclosed in the above discussed application. However, with the device of this application it is possible to achieve an even sharper pattern with more complete deposition of powder coating material. By moving the shroud with its configured opening over the surface of the article to be coated, a continuous pattern of desired configuration, e.g., a stripe or a plurality of stripes if several units are used simultaneously, may be applied. Alternatively, the object to be coated could be moved so as to achieve a continuous pattern as desired.

As was the case with the device disclosed in the above discussed application, the apparatus of this invention is not only adapted for applying coatings to a pattern defined by the shape of the shroud opening, but it is likewise adaptable for painting the entire surface of any part of any article to be coated. This may be accomplished merely by shaping the contouring and the opening of the forward section of the shroud employed in the apparatus such that the powder is electrostatically applied to all surfaces on which a coating is desired. Thus, the apparatus may be adapted to paint either an entire car body or a part thereof, such as a hood, door, etc. It is important to note here that the apparatus of this invention is much more efficient for painting curved surfaces such as would be found on the above mentioned substrates than was the previously discussed apparatus.

As mentioned above, the intake port which is connected to the subatmospheric pressure source, is located centrally of the slotted openings through which the pressurized mixture is forced in operation of the apparatus. This is in contrast to the vacuum pick-up of the previously disclosed apparatus wherein the subatmospheric pressure was applied around the exterior of the shroud. The result of the revised disposition of the vacuum intake port is, in combination with the use of slotted openings for applying the powder coating material, a much greater efficiency in the pick up of the excess powder not adhered to the substrate. As was the case in the previous device, as the excess powder enters the intake port, the mixture flows toward the subatmospheric pressure source. Preferably, the mixture thus removed from the chamber is conducted through a dust collector where the unused powder coating material is collected for recycling through the system. For example, the pressurized mixture discharged from the spray gun may be expanded within the mixing chamber, forced through the slotted opening formed by the baffle plates into the forward section of the shroud and through the opening thereof where the particles are electrostatically attracted to the object to be coated.

It is a significant feature of the apparatus of this invention that by disposing the vacuum intake port between the slotted openings through which the mixture is expelled, it is possible to create eddies of said pressurized mixture flowing from said slotted openings towards said intake port. These eddies assist in the application of the powder in an efficient manner to the substrate and also in the collection of the excess powder not attracted to the substrate. The above discussed field electrodes or strips also assist in the formation of the eddy currents inasmuch as they cause the powder particles coming from the slotted openings to be forced away from the slotted openings toward the substrate. Also, the slating in the formation of eddies flowing in a direction toward the intake port.

By collecting any excess powder directly at the site of the application, it is possible to recycle a given color of powder without contaminating or mixing pigments. Furthermore, the apparatus of the invention makes it practical to apply various colors in sequence without mixing pigments. This could be accomplished preferably by employing a closed color loop, i.e., separate powder source, feed hose, shroud, vacuum source and collecting bag house, for each color. Thus, a production facility could include a number of such closed loops corresponding to the number of colors desired. Preferably, the shroud for applying the various colors would be set up in a clean, dust-free atmosphere such as a booth. However, it is pointed out that such a booth would serve the sole purpose of providing a clean, dust-free environment for the article being coated. Since each shroud would operate as a self-contained unit for applying and recycling powder, any booth employed would not serve the purpose of confining the powder and collecting the excess as was the case with the above-discussed prior art systems. As an alternative to the use of separate closed loops for various colors, it may be practical in production facilities to merely change the hoses connected to the shroud for feeding and collecting powders.

The apparatus of the invention will be better understood by reference to the following detailed description of the preferred embodiment of the invention when read in conjunction with the drawings which:

FIG. 1 is a cut away side view showing the components of the coating device, consisting of a spray gun and coater assembly;

FIG. 2 is a plan cross section of the device; and

FIG. 3 is an end view of the device looking into the shroud assembly.

DETAILED DESCRIPTION OF THE INVENTION

Figure 1:
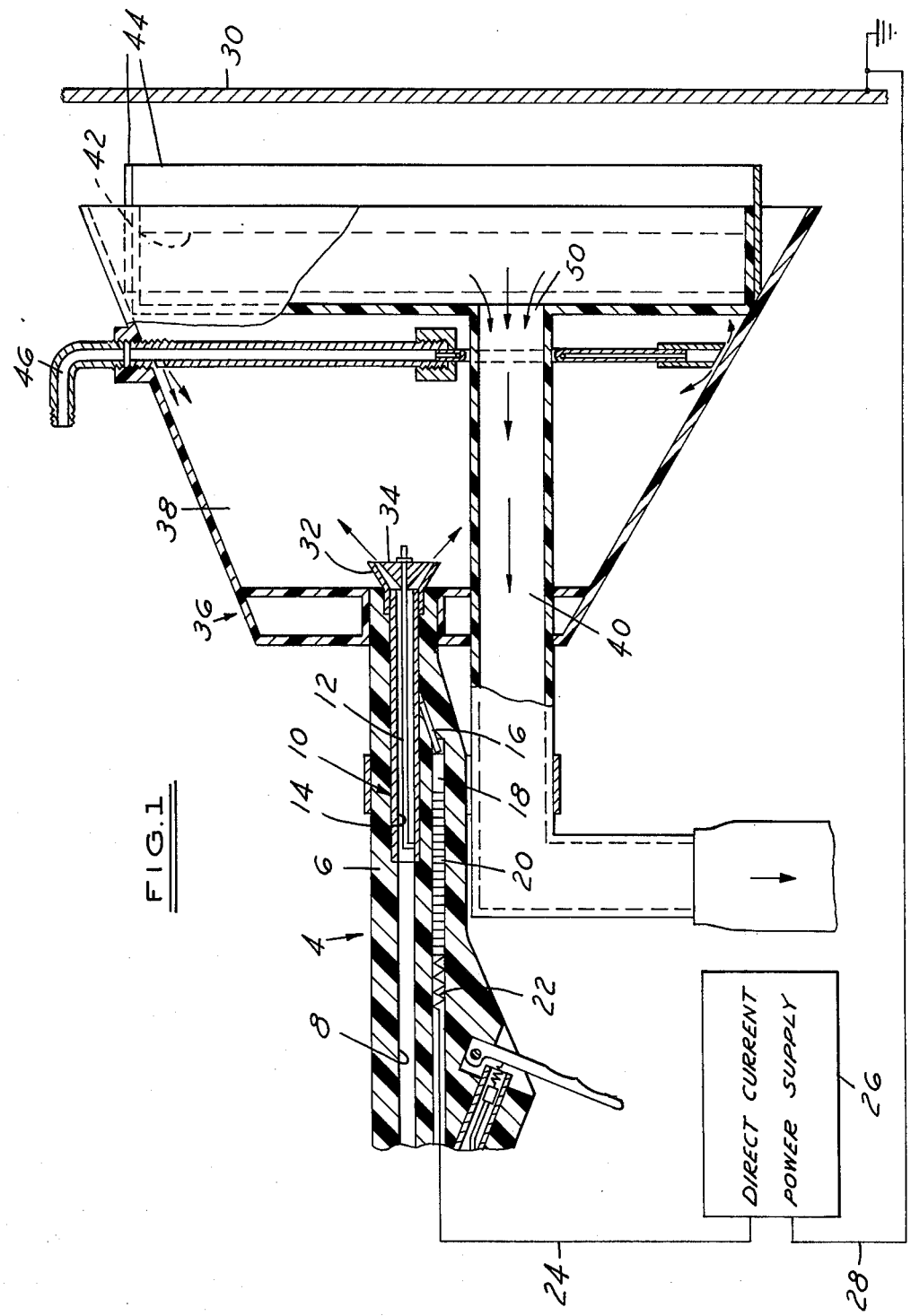

With reference to the drawings in which the numerals used correspond to the same parts in each figure, an electrostatic powder coating apparatus comprises an electrostatic spray gun assembly generally shown at 4 and a shroud-coater assembly generally shown at 36. The coating apparatus is shown in FIGS. 1 and 2 positioned adjacent to grounded object 30, such as a metal panel, on which the powder coating material is to be deposited.

A suitable commercially available electrostatic spray gun 4 is manufactured by the Ashdee Corporation of Evansville, Indiana. This spray gun 4 includes a body portion 6 having a central bore 8 therethrough. A powder inlet fitting, not shown, is located in one end of the bore 8 and a hose, not shown, is connected to it. At the other end of the bore 8, an electrode indicated at 10 is provided. This electrode includes a charging rod 12 and a charging tube 14.

Electrically connected in series with the electrode 10 are a conductive connector rod 16, a conductive high-voltage connector 18, a resistor 20, and a conductive high-voltage spring 22. A conductive element inserted into an electrical connector, not shown, permits connection to the electrostatic spray gun 4 of one terminal 24 of a source of electrical energy, such as a direct-current high-voltage power supply 26. Another terminal 28 of the source of electrical energy is connected to the object 30. Typically, terminal 28 and necessarily object 30 are electrically grounded as indicated in FIGS. 1 and 2. Thus, a large electrical potential difference may be established between electrode 10 of gun 4 and object 30. Spray gun 4 has a nozzle portion 32 which includes adjustment cone 34 supported by charging rod 12 of electrode 10.

The shroud-coater assembly generally shown at 36 in FIG. 1 includes mixing compartment or chamber 38, vacuum intake port 50, vacuum intake conduit 40 running from said intake port to a source of subatmospheric pressure, strip electrodes 42, baffle plates 44 and auxiliary air mainofold 46.

In operation of the device, direct current power supply 26 supplies variable direct current at from 8,000 to 80,000 volts. The powder paint is fluidized in a conventional fluidizer and introduced at the gun barrel bore. Triggering of the gun causes fluidized powder to move under air pressure through the bore and simultaneously switches high voltage to the electrode. As mentioned above, the gun, power supply, fluidizer and powder transport components are commercially available items. Still further, in operation, the apparatus functions as follows: work piece 30 to which the powder is to be applied, is brought into the vicinity of the coater face, approximately to within 1 inch of baffle plates 44. When the trigger of the gun is activated, a powder-air mixture is propelled under air pressure past electrode 10 into mixing chamber 38. The powder is thus charged positively by electrode 10 before being agitated and uniformly dispersed in chamber 38. By properly adjusting auxiliary air pressure in manifold 46, the thoroughly mixed powder-air mixture is blown through openings 48 formed by baffle plates 44 into the vicinity of the grounded target work piece 30. By adjusting the subatmospheric pressure within 40, the powder air-mixture can be made to form eddies (shown by arrows), which enter opening 40 in two streams, and are returned to the original fluidizer source. However, with the grounded work piece in close proximity, a field of electrostatic force lines is formed between the work piece and electrode strips 42, which are connected by wires 52 to charging rod 12. Being of the same polarity as the charged powder, the electrostatic field causes some of the powder within the eddies to be repelled from electrode strips 42 and attracted toward grounded work piece 30. That portion of the powder not attracted to work piece 30 is drawn into port 40 and subsequently returned to the powder fluidizer from whence it originated.

Several of the aforementioned advantages of this apparatus over the apparatus of Ser. No. 443,555 discussed above will be better understood by still further reference to the drawings. It will be noted by reference to FIG. 2 that the powder-air mixture blown through openings 48 formed by baffle plates 44, is returned continuously without loss to vacuum port 50. This condition is maintained even when target surface 30 is not near the base of the applicator. Formation of these eddy currents is enhanced by the action of the auxilary air brought into the mixing chamber 38 through manifold 46. The powder paint pattern thus formed is completely independent of the target surface. As is mentioned above, this is not the situation in the case of the device of Ser. No. 443,555 which depends on a flat surface. As also mentioned above, a serious disadvantage of the prior art device was its marginal performace in coating sharply curved surface due to its dependence on a flat surface for forming a sufficient draught of air capable of causing atmospheric air to move unadhered powder to the powder collector. The apparatus of the present invention, being independent of such a surface and in addition relying on the static electric field produced by strip electrodes 42, is capable of following a curved surface while applying powder effectively.

FIG. 3 further defines placement and location of the field electrode strips 42. It will be noted from both FIGS. 2 and 3 that the two strips have been placed on the inboard side of the outer baffle plates 44. In this placement, maximum opportunity is afforded powder to take on an electrostatic charge of the same polarity as electrode 10, to which the strips are connected by wires 52. Locating the strips so that their edges are normal to and within approximately 2 inches of the work piece creates an optimum electric field, further enhancing electrostatic attraction of powder particles to the work piece.

Manifold 46, visible in FIGS. 1, 2 and 3, accounts for an interesting operational feature of the device. Its primary intended purpose is to assist in propelling the powder-air mixture from the mixing chamber 38 through openings 48. It has been found, however, that by judicially locating openings in manifold 46, air jets could be so directed as to keep powder from accumulating on the walls and bottom panel of the coating chamber, thus contributing to self-cleaning, or purging of mixing chamber 38. Control over the size of the eddies has already been mentioned. An air regulator valve and air pressure gauge, not shown, connected to the line leading to the manifold give this control.

As will be noted from FIG. 1 the intake port 40 can be moved from left to right, so that the port opening 40 can be brought closer to or farther from the port openings 48 of the baffle plates. Conversely, the openings 48 of the baffle plates, can be moved in relation to the opening 40, thus affording control of the formation of the powder eddies. It will also be noted from FIGS. 1 and 2 that the baffle plates 44 in the preferred embodiment of the device extend beyond the leading edge of the shroud-coater assembly 36. This also affords control in depositing powder in a controlled fashion.

As discussed above, the apparatus of the invention is particularly advantageous in the electrostatic application of powder coating materials to large objects, such as automotive vehicle bodies, where frequent color changes are necessary and patterned application may be desired. Preferably, as noted above, separate electrostatic spraying apparatus could be provided for each color to be applied. Alternatively, where practical, the change could be made by simply disconnecting the tube from the electrostatic spray gun and removing subatmospheric pressure source connections followed by a brief cleaning of the apparatus by means of, for example, a blast of compressed air through the air manifold 46.

Based upon the foregoing description of the invention what is claimed and desired to be protected by letters patent is:

1. An apparatus for electrostatically applying powder coating material to a grounded substrate comprising:
   A. means for dispensing from an orifice a pressurized mixture of powder coating particles bearing an electrostatic charge and a gas which is inert to said particles;
   B. a shroud having (i) a rearward boundary which is attached to and surrounds said orifice such that said mixture may be dispensed into said shroud, and (ii) a forward section having an opening adapted to be disposed in a position relative to said substrate such that powder particles issuing from said opening are attracted to said substrate;
   C. a mixing chamber disposed within said shroud between said forward section and said rearward boundry and being adapted to receive said pressurized mixture from said orifice;
   D. at least two slotted openings connecting said mixing chamber with said forward section such that said pressurized mixture may pass from said chamber through said slotted openings into said forward section and through said opening in said forward section toward said substrate;
   E. field electrode means disposed in the vicinity of said slotted openings being in electrical connection with said means for dispensing said pressurized mixture, said field electrode means being adapted to create an electrostatic field such that said charged particles are repelled therefrom in the direction of said substrate; and
   F. an intake port which is disposed in the vicinity of said opening in said forward section between said slotted openings and which is connected to a source of subatmospheric pressure such that eddies of said pressurized mixture flowing from said slotted openings in the direction of said port are created and said powder not attracted to said substrate is collected at said port.

2. An apparatus in accordance with claim 1 wherein each of said slotted openings in formed by a pair of baffle plates which converge toward each other and create a passageway of decreasing cross-section in the direction of flow of said mixture.

3. An apparatus in accordance with claim 2 wherein said slotted openings formed by said converging baffle plates are directed slightly toward said intake port.

4. An apparatus in accordance with claim 2 wherein said slotted openings and said intake port are adapted to be moved relative to each other.

5. An apparatus in accordance with claim 2 wherein said field electrode means are conductive strips and one of said strips is disposed in the vicinity of each of said pairs of baffle plates.

6. An apparatus in accordance with claim 2 wherein there are two of said slotted openings formed by pairs of of baffle plates and wherein said slotted openings extend from the top to the bottom of said shroud and are substantially parallel to each other.

7. An apparatus in accordance with claim 6 wherein said pairs of baffle plates extend beyond the leading edge of said forward section of said shroud.

8. An apparatus in accordance with claim 1 including means for supplying additional pressurized gas to said mixing chamber so as to thereby control the pressure under which said mixture passes through said slotted openings.

9. An apparatus in accordance with claim 8 wherein said means for supplying additional pressurized gas comprises a manifold adapted to supply pressurized gas to said mixing chamber in two or more places.

10. An apparatus in accordance with claim 1 wherein said source of subatmospheric pressure is connected to said intake port by a conduit which passes from said port through the interior of said shroud.

11. An apparatus for electrostatically applying powder coating material to a grounded substrate comprising:
   A. means for dispensing from an orifice a pressurized mixture of powder coating particles bearing an electrostatic charge and a gas which is inert to said particles;
   B. a shroud having (i) a rearward boundary which is attached to and surrounds said orifice such that said mixture may be dispensed into said shroud, and (ii) a forward section having an opening adapted to be disposed in a position relative to said substrate such that powder particles issuing from said opening are attracted to said substrate;
   C. a mixing chamber disposed within said shroud between said forward section and said rearward boundary and being adapted to receive said pressurized mixture from said orifice;
   D. two slotted openings connecting said mixing chamber with said forward section such that said pressurized mixture may pass from said chamber toward and through said opening in said forward section, each of said slotted openings being formed by pairs of baffle plates which converge toward each other and create a passageway of decreasing cross-section in the direction of flow of said mixture and which are disposed such that said slotted openings extend from the top to the bottom of said shroud and are substantially parallel to each other;
   E. field electrode strips disposed along the interior surface of the exterior baffle plate of each of said pairs and being in electrical connection with the electrode of said means for dispensing said pressurized mixture, said electrode strips being adapted to create an electrostatic field such that said charged particles are repelled therefrom in the direction of said substrate;
   F. a manifold adapted to supply additional pressurized gas to said mixing chamber in two or more places so as to thereby control the pressure under which said mixture passes through said slotted openings; and G. an intake port disposed in the vicinity of said opening in said forward section between said slotted openings and which is connected to a source of subatmospheric pressure such that eddies of said pressurized mixture flowing from said slotted openings in the direction of said port are created and said powder not attracted to said substrate is collected at said port.

12. An apparatus in accordance with claim 11 wherein said slotted openings and said intake port are adapted to be moved relative to each other.

13. An apparatus in accordance with claim 11 wherein said source of subatmospheric pressure is connected to said intake port by a conduit which passes from said port through the interior of said shroud.

14. An apparatus in accordance with claim 11 wherein said pairs of baffle plates extend beyond the leading edge of said forward section of said shroud.

* * * * *